(12) United States Patent
Jensen et al.

(10) Patent No.: US 10,828,983 B2
(45) Date of Patent: Nov. 10, 2020

(54) FUEL CONTROL REGULATOR SYSTEM WITH ACOUSTIC PLIABILITY

(71) Applicant: Ford Global Technologies, LLC, Dearborn, MI (US)

(72) Inventors: John W. Jensen, Canton, MI (US); Mahmoud Yousef Ghannam, Canton, MI (US); David James Bauch, South Lyon, MI (US); Howard Churchwell, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 15/926,979

(22) Filed: Mar. 20, 2018

(65) Prior Publication Data
US 2018/0208055 A1    Jul. 26, 2018

Related U.S. Application Data

(63) Continuation of application No. 14/992,854, filed on Jan. 11, 2016, now Pat. No. 9,925,867.

(51) Int. Cl.
*B60K 15/07*    (2006.01)
*B60K 15/077*   (2006.01)
(Continued)

(52) U.S. Cl.
CPC ............ *B60K 15/077* (2013.01); *B60K 28/14* (2013.01); *B60Q 5/006* (2013.01); *G07C 5/004* (2013.01)

(58) Field of Classification Search
None
See application file for complete search history.

(56) References Cited

U.S. PATENT DOCUMENTS 3,868,685 A * 2/1975 Wilmot ................ G01S 7/2925
                                             342/147
4,137,532 A * 1/1979 Taylor, Jr. ........... G01S 13/5248
                                             342/137
(Continued)

FOREIGN PATENT DOCUMENTS

CN    101654089 A    2/2010
DE    102004021648 A 12/2005
(Continued)

OTHER PUBLICATIONS

Search Report dated Jun. 26, 2017 for GB Patent Application No. 1700396.3 (4 Pages).
(Continued)

*Primary Examiner* — Bhavesh V Amin
(74) *Attorney, Agent, or Firm* — Frank Lollo; Eversheds Sutherland (US) LLP (57) ABSTRACT

A fuel control regulator system for a vehicle is disclosed in which a restraint control module registers an acceleration/deceleration that falls outside of predetermined limits. In one embodiment, the fuel control regulator system includes a vehicle including steering, an accelerator, brakes, one or more audio devices in proximity to one or more front crash sensors recording sensor data, a processor, and memory. The restraint control module is coupled to the processor and configured to dynamically adjust a threshold to lie outside of an amplitude of the sensor data of the one or more front crash sensors compromised by sound from the one or more audio devices. In another embodiment, the fuel control regulator system adjusts the sensor data of an affected front crash sensor to lie within an existing threshold. In yet another embodiment, the fuel control regulator system ignores the sensor data of an affected front crash sensor.

6 Claims, 6 Drawing Sheets

(51) Int. Cl.
  *B60K 28/14* (2006.01)
  *B60Q 5/00* (2006.01)
  *G07C 5/00* (2006.01)

(56) References Cited

U.S. PATENT DOCUMENTS

| | | | | |
|---|---|---|---|---|
| 4,193,055 A * | 3/1980 | Barnum | G01S 15/50 | 342/28 |
| 4,213,127 A * | 7/1980 | Cole | G01S 7/2927 | 342/93 |
| 4,221,191 A | 9/1980 | Asano | | |
| 4,461,025 A * | 7/1984 | Franklin | G10L 21/0208 | 381/107 |
| 4,532,639 A * | 7/1985 | Price | G01S 7/35 | 342/93 |
| 4,782,343 A * | 11/1988 | Marchais | G01S 13/524 | 342/160 |
| 5,038,145 A * | 8/1991 | DeCesare | G01S 7/2922 | 342/159 |
| 5,047,995 A * | 9/1991 | Wells | G01V 1/001 | 340/566 |
| 5,208,484 A | 5/1993 | Okano | | |
| 5,251,469 A | 10/1993 | Chan | | |
| 5,337,260 A | 8/1994 | Spangler | | |
| 5,486,806 A * | 1/1996 | Firari | B60R 25/042 | 180/284 |
| 5,539,412 A * | 7/1996 | Mendelson | G01R 23/16 | 324/76.19 |
| 5,612,883 A * | 3/1997 | Shaffer | B60K 31/0008 | 340/435 |
| 5,644,315 A * | 7/1997 | Long | G01S 13/5246 | 342/101 |
| 5,673,365 A * | 9/1997 | Basehore | A47L 9/2805 | 180/282 |
| 5,797,111 A * | 8/1998 | Halasz | B60K 15/01 | 701/103 |
| 5,798,728 A * | 8/1998 | Tomishima | G01S 7/2927 | 342/159 |
| 5,805,110 A * | 9/1998 | McEwan | G01C 3/08 | 342/126 |
| 5,825,098 A * | 10/1998 | Darby | B60R 21/01 | 307/10.1 |
| 5,901,172 A * | 5/1999 | Fontana | G01S 7/292 | 329/311 |
| 5,949,368 A * | 9/1999 | DeCesare | G01S 7/2927 | 342/159 |
| 6,072,248 A * | 6/2000 | Muise | B60R 25/04 | 180/287 |
| 6,081,758 A | 6/2000 | Parvulescu | | |
| 6,191,724 B1 * | 2/2001 | McEwan | G01S 7/35 | 342/118 |
| 6,243,632 B1 | 6/2001 | Jung | | |
| 6,456,231 B1 * | 9/2002 | McEwan | G01S 7/2927 | 342/159 |
| 6,456,331 B2 * | 9/2002 | Kwoh | H04N 5/445 | 348/465 |
| 6,485,057 B1 * | 11/2002 | Midorikawa | B60R 21/01 | 280/801.1 |
| 6,535,161 B1 * | 3/2003 | McEwan | G01F 23/284 | 342/118 |
| 6,536,401 B2 * | 3/2003 | McConnell | B60K 28/14 | 123/198 D |
| 6,640,174 B2 * | 10/2003 | Schondorf | B60K 28/14 | 180/271 |
| 6,766,235 B2 * | 7/2004 | Frimberger | B60K 28/14 | 280/735 |
| 6,819,245 B1 * | 11/2004 | Dilling | B60R 25/102 | 340/435 |
| 7,055,640 B2 * | 6/2006 | Cook | B60K 28/14 | 180/274 |
| 7,278,657 B1 | 10/2007 | McCurdy | | |
| 7,336,219 B1 * | 2/2008 | Lohmeier | G01S 7/354 | 342/159 |
| 7,347,177 B2 * | 3/2008 | Tippy | F02D 41/22 | 123/198 DB |
| 7,477,181 B2 * | 1/2009 | Banaszak | G01S 7/4021 | 342/70 |
| 7,529,606 B2 * | 5/2009 | Tustanowski | F02D 41/3082 | 180/284 |
| 7,683,827 B2 * | 3/2010 | Kelly, Jr. | G01S 7/021 | 342/159 |
| 7,690,458 B2 * | 4/2010 | Ueda | B07B 13/003 | 180/65.31 |
| 7,864,097 B1 * | 1/2011 | Ormesher | G01S 13/767 | 342/42 |
| 8,160,772 B2 * | 4/2012 | Ito | G08G 1/09675 | 701/36 |
| 8,681,844 B2 * | 3/2014 | Abdelmonem | H04B 1/1036 | 375/148 |
| 8,903,620 B2 * | 12/2014 | Hammoud | G05D 1/0088 | 701/70 |
| 9,925,867 B2 * | 3/2018 | Jensen | B60K 15/077 | |
| 2002/0103590 A1 * | 8/2002 | Schondorf | B60R 21/013 | 701/45 |
| 2002/0105423 A1 * | 8/2002 | Rast | G08G 1/162 | 340/479 |
| 2005/0200105 A1 * | 9/2005 | Mihara | B60R 21/0136 | 280/735 |
| 2006/0027412 A1 | 2/2006 | Geborek | | |
| 2006/0137929 A1 | 6/2006 | Yoshida | | |
| 2006/0204039 A1 * | 9/2006 | Maemura | B60T 7/22 | 382/104 |
| 2006/0232052 A1 * | 10/2006 | Breed | B60R 21/0132 | 280/735 |
| 2007/0152433 A1 * | 7/2007 | Weichenberger | B60R 21/013 | 280/735 |
| 2009/0154726 A1 * | 6/2009 | Taenzer | G10L 25/78 | 381/94.1 |
| 2010/0121525 A1 | 5/2010 | Le | | |
| 2010/0212989 A1 * | 8/2010 | Higuchi | B60R 21/0136 | 180/274 |
| 2013/0110368 A1 * | 5/2013 | Zagorski | B60T 7/22 | 701/70 |
| 2013/0118261 A1 * | 5/2013 | Stothers | G01M 5/0033 | 73/645 |
| 2014/0062724 A1 * | 3/2014 | Varoglu | G08G 1/163 | 340/902 |
| 2014/0085470 A1 * | 3/2014 | Sako | B60Q 1/0023 | 348/148 |
| 2015/0061895 A1 * | 3/2015 | Ricci | H04W 4/22 | 340/902 |
| 2015/0114081 A1 | 4/2015 | Imoto | | |
| 2015/0199955 A1 * | 7/2015 | Draganic | G10K 15/02 | 381/86 |
| 2016/0001781 A1 * | 1/2016 | Fung | G06F 19/345 | 701/36 |
| 2016/0362075 A1 | 12/2016 | Dlagnekov | | |
| 2017/0197504 A1 * | 7/2017 | Jensen | B60K 28/14 | |

FOREIGN PATENT DOCUMENTS

| | | |
|---|---|---|
| DE | 102008040558 A1 | 1/2010 |
| EP | 2075164 A | 7/2009 |
| FR | 2909044 A1 | 5/2008 |
| GB | 2547771 A | 8/2017 |
| JP | 2003262648 A | 9/2003 |
| JP | 2007232566 A | 9/2007 |
| JP | 2007237835 A | 9/2007 |
| JP | 2009234427 A | 10/2009 |
| JP | 2010177973 A | 8/2010 |
| JP | 2012052851 A | 3/2012 |
| JP | 2013051553 A | 3/2013 |
| KR | 19970036108 A | 7/1997 |
| KR | 20030092281 A | 12/2003 |

OTHER PUBLICATIONS

Instructions on Style for the Washington Administrative Code WAC 2009, 17 pages, downloaded from: http://www.dol.wa.gov/business/boards/docs/InstructionsOnStyle.pdf (Year: 2009).

(56) References Cited

OTHER PUBLICATIONS

JPO machine translation of JP 2007-232566 (original JP document published Sep. 13, 2007) (Year: 2007).
JPO machine translation of JP 2012-052851 (original JP document published Mar. 15, 2012) (Year: 2012).
New Methods for Adaptive Noise Suppression, https://www.researchgate.net/publication/232629444—May 1995 (pp. 1-5).
Noise Cancelling in audio signal with adaptive filter—Draghiciu Nicole, Reiz Romulus, University of Oradea (vol. 45), Nov. 6, 2004 (pp. 1-4).
Noise Removal in Speech Processing Using Spectral Subtraction—http://www.scirp.org/journal/jsip,http://dx.doi.org/10.4236/jsip.2014.52006 (pp. 1-10) (Year: 2014).
Search Report dated Jun. 20, 2017 for GB Patent Application No. 1700396.3 (4 Pages).

\* cited by examiner

FIG. 6

FUEL CONTROL REGULATOR SYSTEM WITH ACOUSTIC PLIABILITY

CROSS-REFERENCE TO RELATED APPLICATIONS

This application is a continuation of U.S. patent application Ser. No. 14/992,854 filed on Jan. 11, 2016, which will issue as U.S. Pat. No. 9,925,867 on Mar. 27, 2018 is incorporated herein by reference in its entirety.

BACKGROUND

This application relates generally to the field of automobile fuel control regulator systems, and more particularly to systems and methods for controlling the operation of automobile fuel control regulator systems.

Front Crash Sensors (FCS's) associated with a vehicle Restraint Control Module (RCM) are often located near the front of an automobile. When activating the vehicle's horn or siren, which also may be located near the front of the vehicle, one or more of the signals produced by the FCS's may unintentionally be magnified or otherwise affected by sounding the horn or siren. The FCS's signal may fall outside of predetermined ranges and therefore be interpreted by the RCM as sensing a vehicle crash. In turn, the RCM may erroneously issue a Fuel Cut-Off (FCO) command, which causes the fuel pump to cease pumping fuel to the engine as a safety measure to the occupants of the vehicle, ultimately resulting in loss of vehicle engine power. Consequently, unintended loss of engine power (or modulation of fuel pump performance) during normal driving conditions may occur as a result of the FCS's being affected by the activation of the horn or siren. Moving the FCS's or the horn away from one another is not a viable solution given that the optimal mounting locations for the horn and the FCS's overlap. Aggressive driving together with horn activation exacerbates the problem of the FCS's registering outside of predetermined limits.

There is a need, therefore, to prevent erroneous FCO commands resulting from the noise contamination of one or both of the FCS's due to their physical proximity to a vehicle's horn, siren, or other audio device.

SUMMARY

An embodiment of a fuel control regulator system is disclosed, comprising a vehicle including steering, an accelerator, brakes, one or more audio devices in proximity to one or more front crash sensors recording sensor data, a processor, and memory. In this embodiment, the fuel control regulator system includes a restraint control module coupled to the processor and configured to dynamically adjust a threshold to lie outside of an amplitude of the sensor data of the one or more front crash sensors compromised by sound from the one or more audio devices.

The restraint control module may be configured to determine activation status of one or more audio devices. The restraint control module may also be configured to determine proximity of the audio devices to the one or more front crash sensors.

The restraint control module may further be configured to register an acceleration or a deceleration of the vehicle that falls outside of predetermined limits, and to confirm whether the front crash sensor data lies within the adjusted threshold. The restraint control module is configured to not issue a fuel shut-off command if the acceleration or the deceleration falls outside of the predetermined limits and if the amplitude of the sensor data lies within the adjusted threshold. In response to determining by the restraint control module that the acceleration or the deceleration falls outside of the predetermined limits, that the one or more audio devices is activated to produce sound, that the one or more audio devices is in close proximity to the one or more front crash sensors, and that the adjusted threshold of the sensor data lies outside of the amplitude of the sensor data of the one or more front crash sensors, the restraint control module is configured to not issue a fuel shut-off command to a vehicle fuel pump.

Another embodiment of a fuel control regulator system is disclosed, comprising a vehicle including steering, an accelerator, brakes, one or more audio devices in proximity to one or more front crash sensors recording sensor data, a processor, and memory. In this embodiment, the fuel control regulator system includes a restraint control module coupled to the processor and configured to dynamically adjust an amplitude of the sensor data of the one or more front crash sensors compromised by sound from the one or more audio devices to lie within a predetermined threshold.

The restraint control module may be configured to determine activation status of one or more audio devices. The restraint control module may also be configured to determine proximity of the audio devices to the one or more front crash sensors.

The restraint control module may further be configured to register an acceleration or a deceleration of the vehicle that falls outside of predetermined limits, and to confirm whether the front crash sensor data lies within the predetermined threshold. The restraint control module may be configured to not issue a fuel shut-off command if the acceleration or the deceleration falls outside of the predetermined limits and if the adjusted amplitude of the sensor data lies within the predetermined threshold. In response to determining by the restraint control module that the acceleration or the deceleration falls outside of the predetermined limits, that the one or more audio devices is activated to produce sound, that the one or more audio devices is in close proximity to the one or more front crash sensors, and that the adjusted amplitude of the sensor data lies within the predetermined threshold, the restraint control module is configured to not issue a fuel shut-off command to a vehicle fuel pump.

Another embodiment of a fuel control regulator system is disclosed, comprising a vehicle including steering, an accelerator, brakes, one or more audio devices in proximity to one or more front crash sensors recording sensor data, a processor, and memory. In this embodiment, the fuel control regulator system includes a restraint control module coupled to the processor and configured to dynamically ignore the sensor data of the one or more front crash sensors compromised by sound from the one or more audio devices and accept the sensor data from one of the other front crash sensors.

The restraint control module may be configured to determine activation status of one or more audio devices. The restraint control module may be configured to determine proximity of the audio devices to the one or more front crash sensors.

The restraint control module is configured to register an acceleration or a deceleration of the vehicle that falls outside of predetermined limits, and to confirm whether the front crash sensor data lies within a predetermined threshold.

The restraint control module may be configured to not issue a fuel shut-off command if the acceleration or the deceleration falls outside of the predetermined limits, if the sensor data from the one of the other front crash sensors is accepted, and if the compromised one or more front crash sensors is ignored. In response to determining by the restraint control module that the acceleration or the deceleration falls outside of the predetermined limits, that the one or more audio devices is activated to produce sound, that the one or more audio devices is in close proximity to the one or more front crash sensors, that the sensor data from the one of the other front crash sensors is accepted, and that the compromised one or more front crash sensors is ignored, the restraint control module is configured to not issue a fuel shut-off command to a vehicle fuel pump.

The one or more audio devices may include a vehicle siren. The one or more audio devices may also include a vehicle horn.

DETAILED DESCRIPTION

Although the figures and the instant disclosure describe one or more embodiments of a fuel control regulator system, one of ordinary skill in the art would appreciate that the teachings of the instant disclosure would not be limited to these embodiments.

Turning now to the drawings wherein like reference numerals refer to like elements, there are shown exemplary embodiments and methods of a fuel control regulator system adapted to accommodate external audio systems located in close proximity to vehicle front crash sensors so as to avoid unintended fuel shut-off of the vehicle when the audio systems are in use.

Figure 1A:
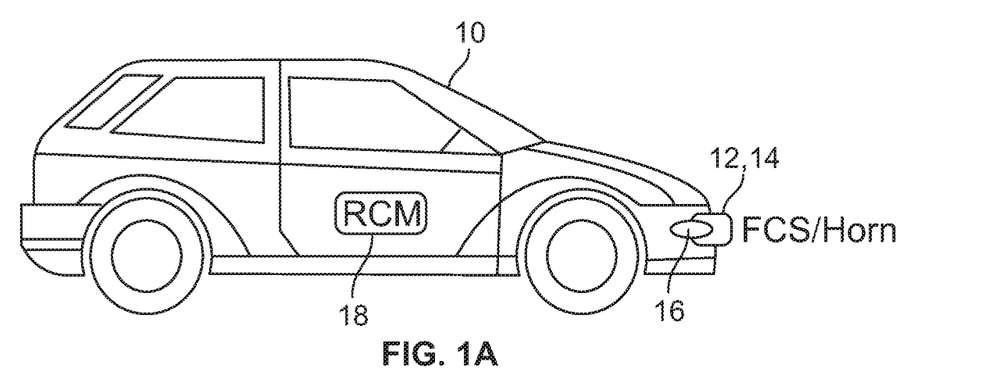
FIG. 1A illustrates a side view of a vehicle of the instant disclosure.
Figure 1B:
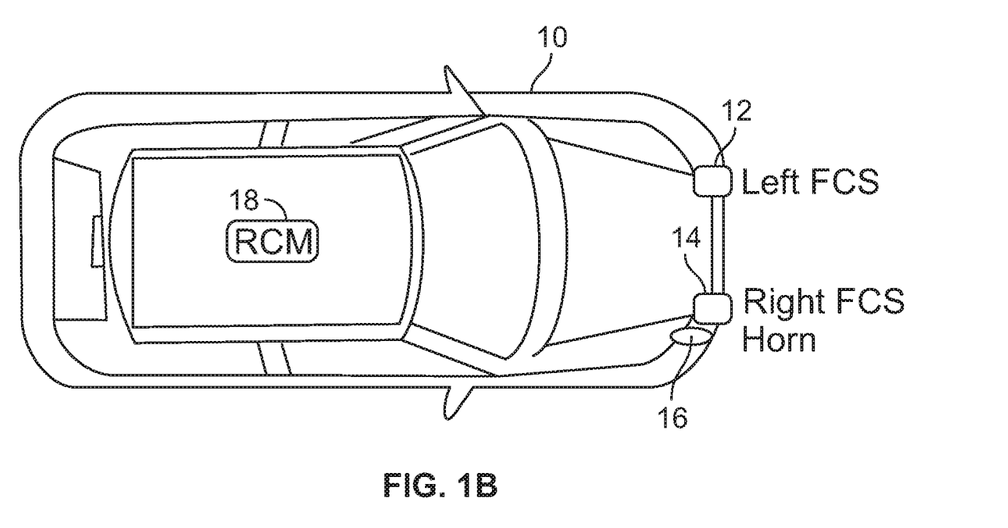
FIG. 1B illustrates a top plan view of the vehicle shown in FIG. 1A.

As shown in FIGS. 1A-1B, vehicle 10 includes left front crash sensor (LFCS) 12 positioned at or near the front left portion of vehicle 10, right front crash sensor (RFCS) 14 positioned at or near the front right portion of vehicle 10, audio device 16 positioned in proximity to the right front crash sensor 14, and restraint control module (RCM) 18 positioned at or near the center of gravity of vehicle 10. In other embodiments, audio device 16 may be positioned in proximity to the left front crash sensor 12. Audio device 16 may include any number or type of devices that emit sound waves, including one or more horns or sirens. Vehicle 10 may be configured with any number of front crash sensors without departing from the disclosure. Vehicle 10 may include crash sensors positioned elsewhere on the vehicle other than the front of the vehicle without departing from the instant disclosure.

Figure 2:
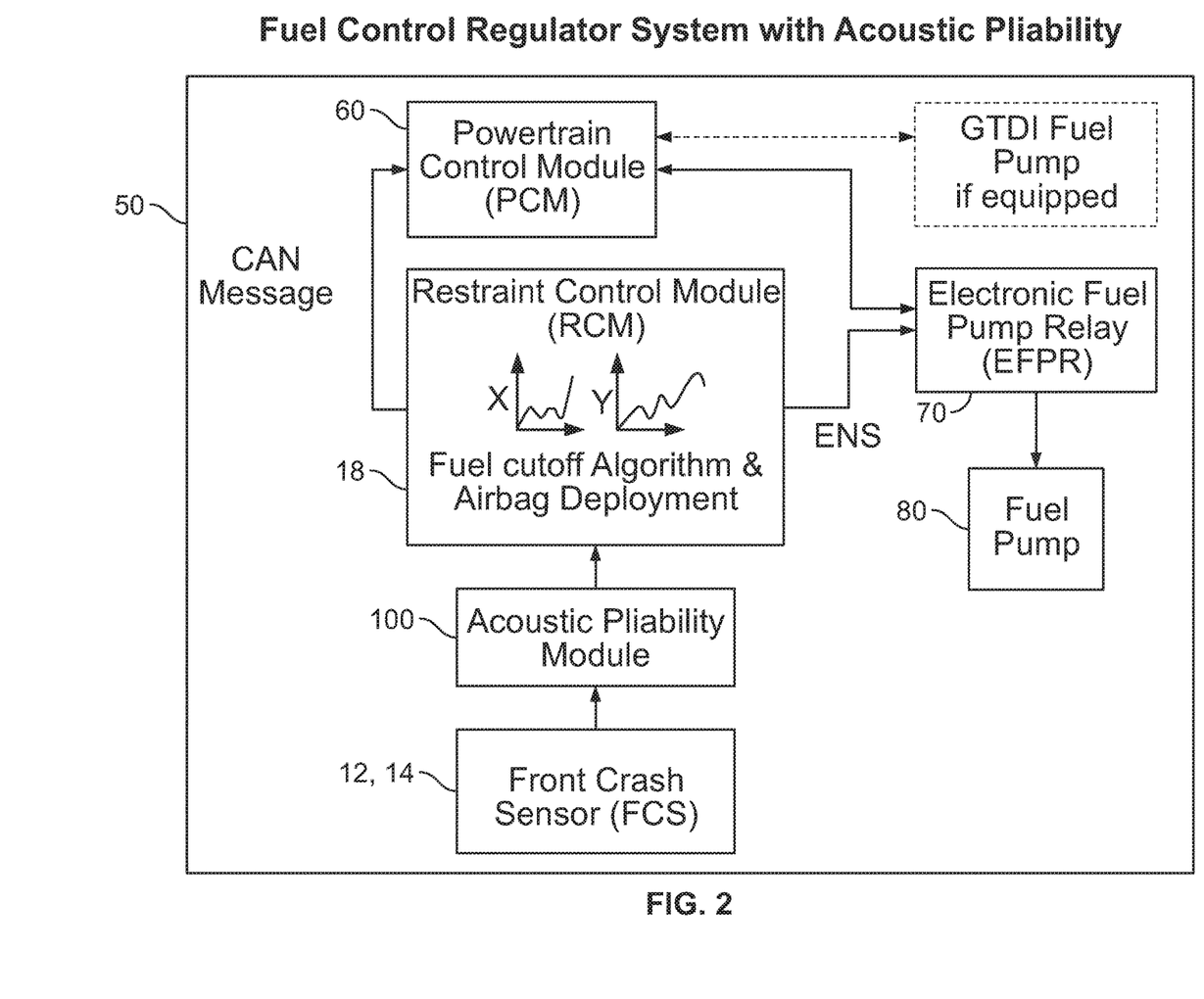
FIG. 2 illustrates a schematic of one embodiment of a fuel control regulator system of the instant disclosure.

Turning to FIG. 2, vehicle 10 includes fuel control regulator system 50. Fuel control regulator system 50 includes powertrain control module (PCM) 60, restraint control module (RCM) 18, one or more front crash sensors 12,14, electronic fuel pump relay (EFPR) 70, fuel pump 80, and acoustic pliability module 100. Powertrain control module 60 is connected to restraint control module 18, which is connected to the one or more front crash sensors 12,14. Restraint control module 18 is connected to electronic fuel pump relay 70, which is connected to fuel pump 80.

Restraint control module (RCM) 18 is configured to receive sensor data and/or one or more electronic signals from the one or more front crash sensors 12,14. Restraint control module (RCM) 18 is also configured to transmit a fuel cut-off command to electronic fuel pump relay 70 and/or to fuel pump 80 to cause fuel pump 80 to cease pumping fuel to the vehicle's engine if the restraint control module 18 determines that the sensor data received from the one or more front crash sensors 12,14 exceed predetermined limits.

In various embodiments, acoustic pliability module 100 is configured to reduce or otherwise adjust, remove, and/or suppress sensor data from the one or more front crash sensors 12,14. Fuel control regulator system 50 having acoustic pliability module 100 may also be configured to determine which of the one or more front crash sensors 12,14 is not contaminated by an activated audio device 16 and pass only the sensor data and/or signal from those unaffected front crash sensor to the restraint control module 18.

Figure 3A:
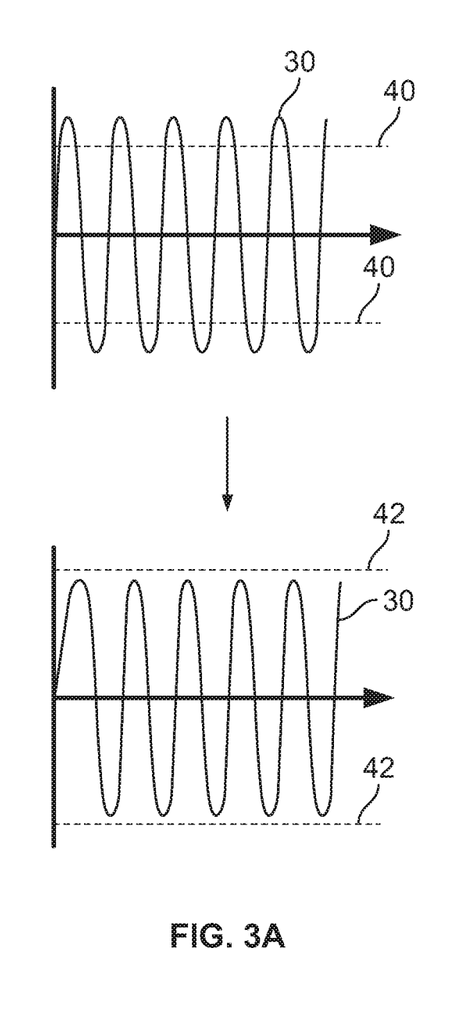
FIG. 3A illustrates an aspect of the fuel control regulator system of the instant disclosure.
Figure 3B:
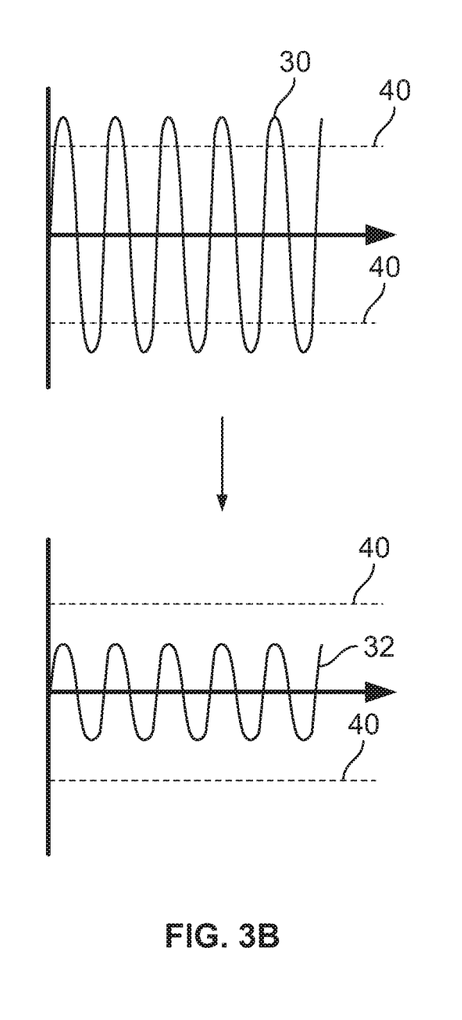
FIG. 3B illustrates another aspect of the fuel control regulator system of the instant disclosure.
Figure 3C:
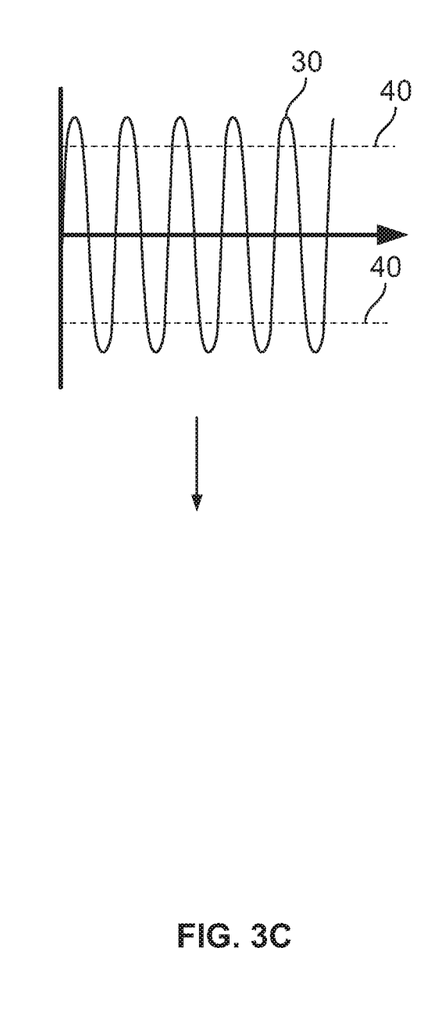
FIG. 3C illustrates yet another aspect of the fuel control regulator system of the instant disclosure.

Turning to FIGS. 3A-3C, in one embodiment, acoustic pliability module 100 is configured to adjust the predetermined limits for the signal received from the one or more crash sensors 12,14 that it determines is contaminated with acoustic noise so as to avoid triggering a fuel cut-off command. For example, FIG. 3A shows an example of a noise-contaminated front crash sensor signal 30 that lies outside of predetermined limits 40, which signal 30 would be interpreted by the restraint control module 18 as indicative of a crash in the front of the vehicle. FIG. 3A additionally shows how the predetermined limits 40 of that noise-contaminated front crash sensor signal 30 can be adjusted on the fly to cause the noise contaminated front crash sensor signal 30 to lie with the newly adjusted limits 42.

In another embodiment as shown in FIG. 3B, the acoustic pliability module 100 is configured to adjust on the fly the noise-contaminated front crash sensor signal 30 received from the one or more crash sensors 12,14 to remain within the predetermined limits 40 so as to avoid triggering a fuel-cut-off command. The acoustic pliability module 100 is configured to pass the adjusted front crash sensor signal 32 to the restraint control module 18, which will interpret the adjusted signal 32 as being within the predetermined limits 40 and therefore not transmit a fuel cutoff signal to the fuel pump 80.

In another embodiment as shown in FIG. 3C, the acoustic pliability module 100 is configured to delete or remove on the fly the noise-contaminated signal 30 received from the one or more crash sensors 12,14 and cause the uncontaminated signal received from at least one of the other of the crash sensors 12,14 to pass to the restraint control module 18, which will interpret the uncontaminated signal as being within the predetermined limits 40 and therefore not transmit a fuel cutoff signal to the fuel pump 80.

Figure 4:
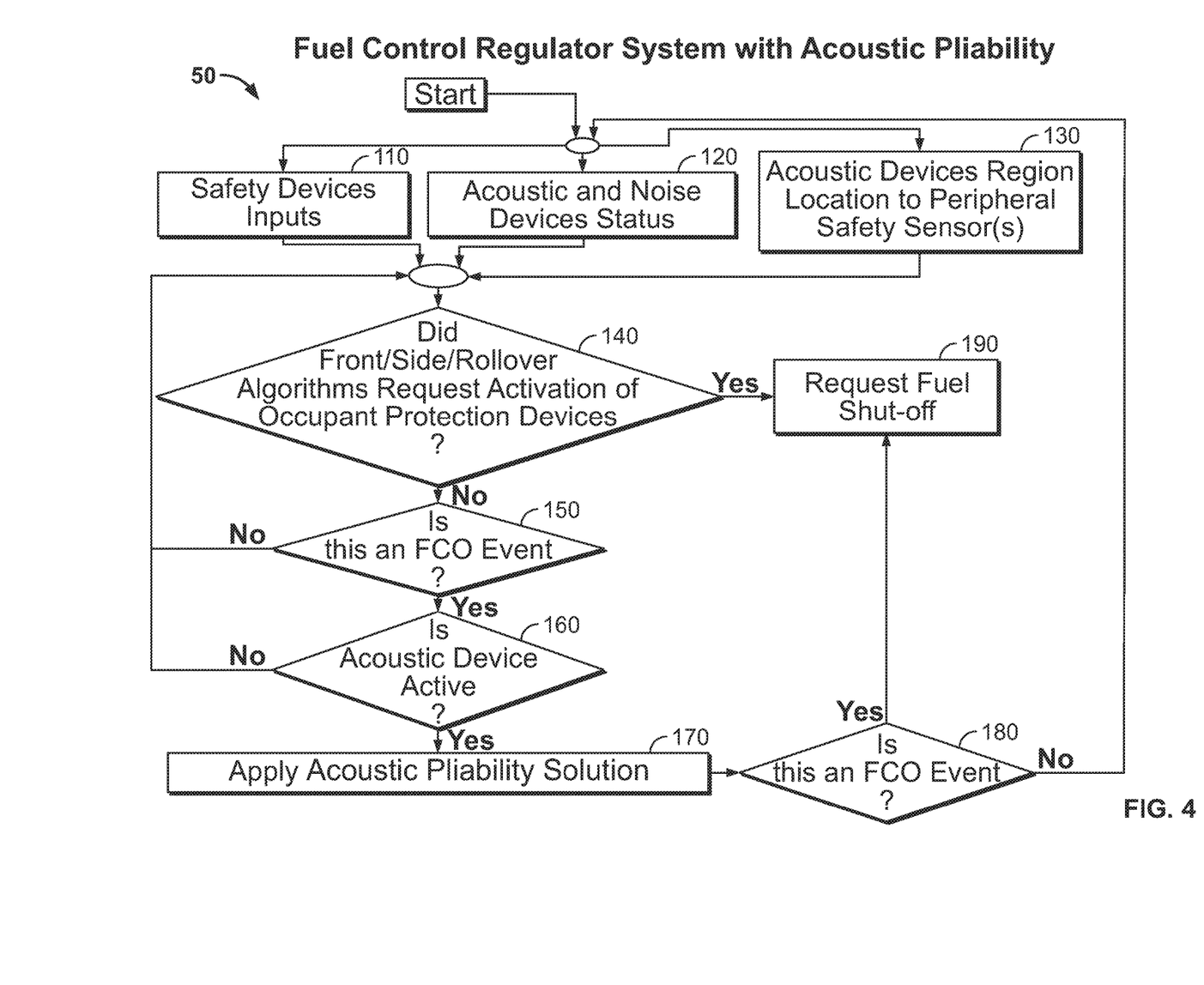
FIG. 4 illustrates a block diagram of an exemplary method of use of an embodiment of a fuel control regulator system of the instant disclosure.

Turning now to FIG. 4, during operation of vehicle 10, restraint control module 18 of fuel control regulator system 50 is configured to receive various inputs and determine in real-time from those inputs whether a fuel shut-off command should be transmitted to the fuel pump 80. For example, restraint control module 18 is configured to receive safety devices inputs 110, activated or inactivated status 120 of the one or more audio devices 16, and proximity and/or physical location data 130 of the one or more audio devices 16 in relation to the position of the respective front crash sensors 12,14. In various embodiments, safety devices inputs 110 include one or more signals from one or more accelerometers (including front crash sensors 12,14 and those associated with the restraint control module 18) configured to sense longitudinal and lateral acceleration/deceleration of vehicle 10, including for example, vehicle rollovers and sudden vehicle deceleration/acceleration in any direction. To detect vehicle rollover, one or more accelerometers may be positioned at or near the center of gravity of the vehicle 10. To detect sudden lateral or longitudinal accelerations indicative of a crash at the front or side of vehicle 10, one or more accelerometers may be positioned at or near the center of gravity of the vehicle 10 and at or near various peripheral locations of vehicle 10. In various embodiments, safety devices inputs 110 include one or more signals from one or more pressure sensors configured to detect sudden changes in pressure, which may be indicative of a crash of vehicle 10. Front crash sensors 12,14 may be configured to detect vehicle accelerations/decelerations, changes in pressure or all of the foregoing.

Restraint control module 18 of fuel control regulator system 50 is configured at step 140 via one or more computer algorithms and/or subprograms to decide whether one or more signals received from safety devices inputs 110 are indicative of a front or side vehicle impact or a rollover of vehicle 10. For example, if the restraint control module 18 receives one or more safety devices inputs 110 that fall outside of predetermined limits and therefore is indicative of a crash, the restraint control module 18 may be configured to perform additional evaluations before deciding to initiate a fuel cut-off signal to fuel pump 80.

In various embodiments, restraint control module 18 at step 140 may register an acceleration/deceleration that falls outside of predetermined limits, such as may occur from aggressively driving vehicle 10 or operating vehicle 10 on excessively bumpy roads. Restraint control module 18 may be configured at step 150 to determine whether signals from one or both of the front crash sensors 12,14 lie within predetermined limits, and if yes, then no fuel cut-off command will be sent to the fuel pump 80. However, if a signal from one or both of the front crash sensors 12,14 lie outside predetermined limits, then at step 160 restraint control module 18 may be configured to determine whether the out-of-limit condition is due to an actual vehicle crash or due to audio contamination of the signal from the one or both front crash sensors 12,14. To do this, restraint control module 18 determines at step 160 determines from the activated or inactivated status 120 of the one or more audio devices 16 whether the one or more audio devices 16 is activated (e.g., siren is turned on), and if no, then no fuel cut-off command will be sent to the fuel pump 80. However, if yes, then restraint control module 18 determines at step 160 from the proximity and/or physical location data 130 of the one or more audio devices 16 in relation to the position of the respective front crash sensors 12,14 whether the one or more audio devices 16 is physically located in proximity to the one or both of the front crash sensors 12,14. If yes, then acoustic pliability module 100 at step 170 may be configured to reduce or otherwise adjust, remove, and/or suppress sensor data from the one or more front crash sensors 12,14 as described above. If acoustic pliability module 100 is successful at reducing or otherwise adjusting, removing, and/or suppressing sensor data from the one or more front crash sensors 12,14, then restraint control module 18 at step 170 will not transmit a fuel shut-off command to fuel pump 80. However, if restraint control module 18 determines at step 180 that a vehicle crash has actually occurred because a signal from at least one of the front crash sensors 12,14 still registers outside of limits, then restraint control module 18 transmits a fuel shut-off command to fuel pump 80 at step 190.

To illustrate how an embodiment of a fuel control regulator system 50 may operate during operation of vehicle 10, if restraint control module 18 registers an acceleration/deceleration that falls outside of predetermined limits but confirmation is received that both the left and right front crash sensors 12,14 lie within predetermined limits, then no fuel shut-off command will be sent to the fuel pump 80. However, if one of the left or right front crash sensors 12,14 lies outside of predetermined limits, the fuel control regulator system 50 may be programmed to determine, as disclosed above, whether acoustic noise from an activated one or more audio devices 16 located in proximity to the out-of-limit sensor is the cause of the out-of-limit condition, and if so, to apply one of the techniques disclosed above via the acoustic pliability module 100 to remedy the compromised sensor to avoid transmitting an undesired fuel shut-off command to the fuel pump 80.

In one embodiment of a fuel control regulator system 50 in which restraint control module 18 registers an acceleration/deceleration that falls outside of predetermined limits, the fuel control regulator system 50: (1) determines the activation/inactivation status of one or more audio devices 16; (2) determines whether and which one or more of front crash sensors 12,14 are located in the vicinity of the one or more audio devices 16; and (3) adjusts the confirmation threshold for the one or more compromised front crash sensors 12,14 based on a predetermined adjustment level to cause the signal to lie within the adjusted threshold. In other embodiments, adjusting the confirmation threshold may be determined dynamically based on the amplitude of the signal from the compromised sensor to cause the signal to lie within the adjusted threshold.

In another embodiment of a fuel control regulator system 50 in which restraint control module 18 registers an acceleration/deceleration that falls outside of predetermined limits, the fuel control regulator system 50: (1) determines the activation/inactivation status of one or more audio devices 16; (2) determines whether and which one or more of front crash sensors 12,14 are located in the vicinity of the one or more audio devices 16; and (3) characterizes the signal of the one or more compromised front crash sensors 12,14 and restore the signal to an equivalent normal that lies within the predetermined limits. In this embodiment, one or more numerical mathematical techniques may be employed, including Fast Fourier Transforms (FTT), Laplace transforms, and predefined mathematical filters.

In another embodiment of a fuel control regulator system 50 in which restraint control module 18 registers an acceleration/deceleration that falls outside of predetermined limits, the fuel control regulator system 50: (1) determines the activation/inactivation status of one or more audio devices 16; (2) determines whether and which one or more of front crash sensors 12,14 are located in the vicinity of the one or more audio devices 16; (3) determines whether the signal from the one or more of the front crash sensors 12,14 is contaminated by the sound produced by the activated one or more audio devices 16; (4) determines which of the one or more of the front crash sensors 12,14 produces contaminated signals erroneously in excess of predetermined limits; and (5) determines an acceptable alternative front crash sensor 12,14 that produces signals lying within predetermined limits; and (6) uses the signals from the alternative front crash sensor 12,14 and ignores the signals from the one or more contaminated front crash sensors 12,14 to avoid erroneously transmitting a fuel shut-off command to the fuel pump 80.

Vehicle 10 may be a standard gasoline powered vehicle, a hybrid vehicle, an electric vehicle, a fuel cell vehicle, or any other type of suitable vehicle. Vehicle 10 includes standard features (not shown) such as a dashboard, adjustable seats, one or more batteries, an engine or motor, a transmission, an HVAC system including a compressor and electronic expansion valve, a windshield, doors, windows, seatbelts, airbags, and tires.

Figure 5:
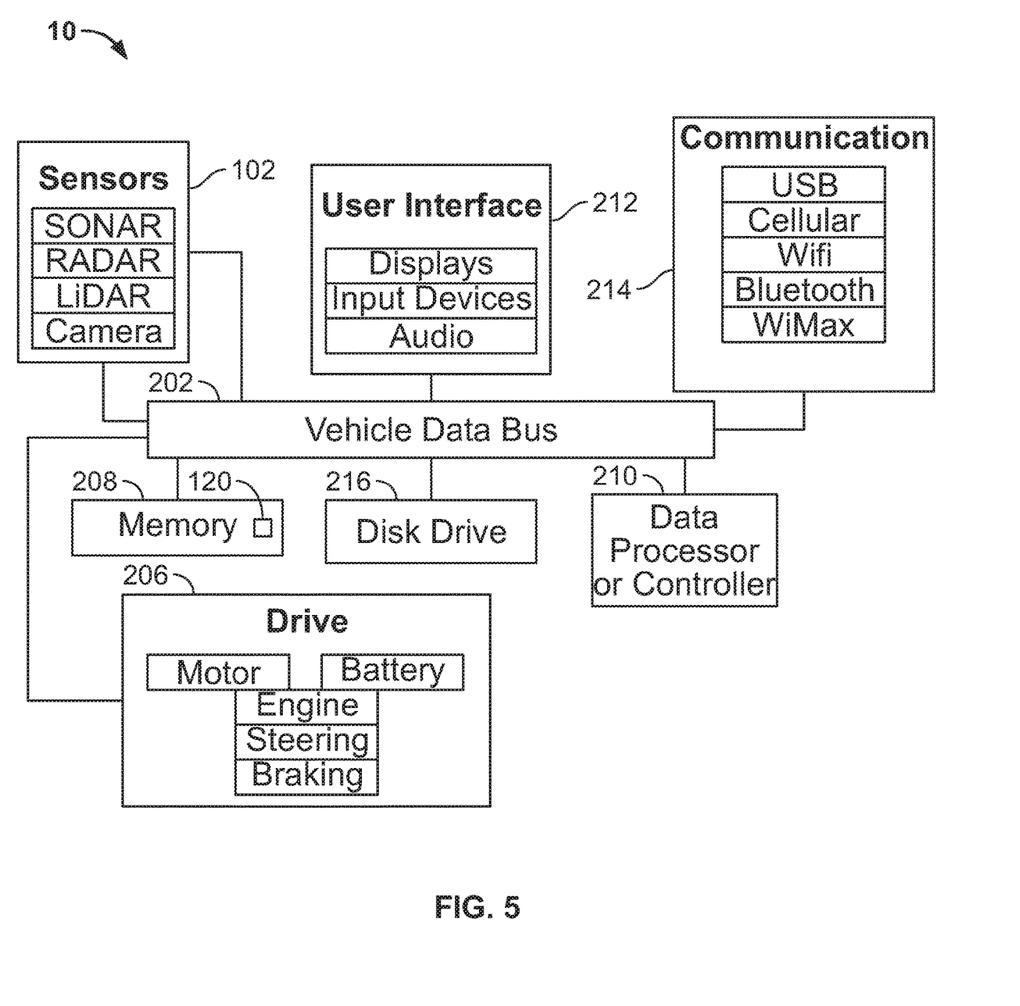
FIG. 5 illustrates a block diagram of exemplary components of the vehicle shown in FIG. 1A.

As shown in FIG. 5, vehicle 10 may include sensors 102, which may be arranged in and around the vehicle in a suitable fashion. Sensors 102 can all be the same or they can vary from one to the next. There can be many sensors or only a single sensor. Sensors 102 may include a camera, sonar, LiDAR, radar, an optical sensor, an ultrasonic sensor, or an infrared device configured to measure properties around the exterior of vehicle 10. Sensors 102 may include gear sensors configured to detect gear engagement, accelerometers configured to detect acceleration, speed sensors, and torque sensors. Some sensors 102 may be mounted inside the passenger compartment of vehicle 10, around the exterior of the vehicle, or in the engine compartment of vehicle 10. At least one sensor 102 may be used to identify the vehicle's driver via facial recognition, speech recognition, or communication with a device, such as a vehicle key or mobile phone personal to the driver. Sensors 102 may have an OFF state and various ON states. Vehicle 10, or a device operatively connected to the vehicle, may be configured to control the states or activity of the sensors. It should be appreciated that the term "internal sensors" includes all sensors mounted to the vehicle, including sensors that are mounted to an exterior of vehicle 10.

As shown in FIG. 5, in one embodiment, vehicle 10 includes a vehicle data bus 202 operatively coupled to sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM (R) Association, Long Term Evolution (LTE) (TM), or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of vehicle 10 to input modifications or updates to information shown, for example, in a vehicle display. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive 216 is configured to receive a computer readable medium. In certain embodiments, the disk drive 216 receives the computer-readable medium on which one or more sets of instructions, such as the software for operating fuel control regulator system 50 of the instant disclosure. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 10 includes one or more computer programs or subprograms stored in the memory 208 for operating fuel control regulator system 50. When executed by the processor, such programs or subprograms for operating fuel control regulator system 50 generate or select instructions for other elements of the vehicle to perform. In various embodiments, such programs or subprograms are configured to direct instructions to the user interface 212, the communication devices 214, the vehicle drive 206, the sensors 102, the processor 210, and any other component operatively connected to the vehicle data bus 202. It should be appreciated that vehicle 10 may be fully autonomous or partially autonomous.

Figure 6:
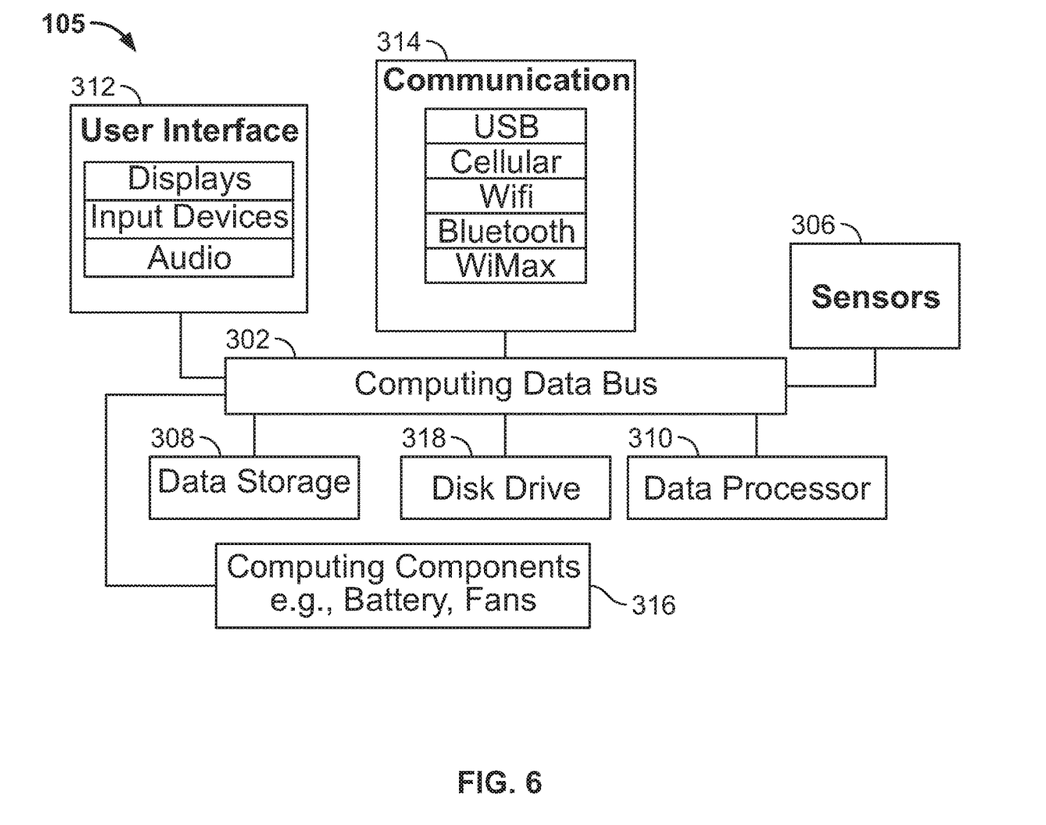
FIG. 6 illustrates a block diagram of an exemplary computing device operatively connected to the vehicle shown in FIG. 1A.

In various embodiments, a computing device 105 is operatively connected to the vehicle 10 via any suitable data connection such as WiFi, Bluetooth, USB, or a cellular data connection. In one embodiment, shown in FIG. 6, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 10 as described above. For example, the communication devices 314 of the computing device 105 may operate similar to the communication devices 214 of the vehicle 10. The same applies to the user interface 312, the sensors 306, the data storage 308, the processor 310, and the disk drive 318. In various embodiments, the computing device 105 is a mobile phone or a server.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A vehicle comprising
    an audio device;
    a front crash sensor;
    a restraint control module configured to:
        determine that sensor measurements from the front crash sensor exceed a threshold;
        determine that the audio device is active;
        dynamically adjust, based on the determination that the audio device is active, the threshold to an adjusted threshold to account for a portion of sensor measurements attributable to noise contamination from the audio device;
        determine that the sensor measurements exceed the adjusted threshold; and
        issue, based on the determination that the sensor measurements exceed the adjusted threshold, a fuel shut-off command.

2. The vehicle of claim 1, including an accelerometer, and wherein dynamically adjust the threshold is further based on sensor measurements from the accelerometer exceeding the threshold.

3. The vehicle of claim 1, including first and second accelerometers, and wherein dynamically adjust the threshold is further based on sensor measurements from either the first or second accelerometers exceeding the threshold.

4. The vehicle of claim 1, wherein dynamically adjust the threshold is further based on a proximity of the audio device to the front crash sensor.

5. The vehicle of claim 1, wherein the audio device is at least one of:
    a horn or a siren.

6. A method comprising:
    Determining, by a processor, that sensor measurements from a front crash sensor of a vehicle exceed a threshold;
    Determining, by the processor, that an audio device of the vehicle is active;
    dynamically adjusting by the processor, based on the determination that the audio device is active, the threshold to an adjusted threshold to account for a portion of sensor measurements attributable to noise contamination from the audio device;
    determining, by the processor, that the sensor measurements exceed the adjusted threshold; and the processor issuing, based on the determination that the sensor measurements exceed the adjusted threshold, a fuel shut-off command to the fuel pump of the vehicle.

* * * * *